United States Patent
Wada

(10) Patent No.: US 7,798,284 B2
(45) Date of Patent: Sep. 21, 2010

(54) ELECTRO-OPTICAL DEVICE AND ELECTRONIC APPARATUS

(75) Inventor: Hiroshi Wada, Nagano (JP)

(73) Assignee: Seiko Epson Corporation (JP)

( * ) Notice: Subject to any disclaimer, the term of this patent is extended or adjusted under 35 U.S.C. 154(b) by 1004 days.

(21) Appl. No.: 11/210,008

(22) Filed: Aug. 23, 2005

(65) Prior Publication Data
US 2006/0051075 A1 Mar. 9, 2006

(30) Foreign Application Priority Data
Sep. 9, 2004 (JP) ............................. 2004-261987

(51) Int. Cl.
A47B 81/06 (2006.01)
(52) U.S. Cl. .................. 181/199; 181/171; 181/148
(58) Field of Classification Search ............... 181/199, 181/171, 148; 381/152, 388, 345, 386, 395, 381/333; 340/384.6, 384.1; 455/550.1
See application file for complete search history.

(56) References Cited

U.S. PATENT DOCUMENTS

| | | | | |
|---|---|---|---|---|
| 5,416,463 | A * | 5/1995 | Higgins et al. | 340/384.73 |
| 5,894,263 | A * | 4/1999 | Shimakawa et al. | 340/388.1 |
| 6,208,238 | B1 * | 3/2001 | Ohta | 340/391.1 |
| 6,427,017 | B1 * | 7/2002 | Toki | 381/190 |
| 6,481,173 | B1 * | 11/2002 | Roy et al. | 52/506.07 |
| 6,522,759 | B1 * | 2/2003 | Mori | 381/150 |
| 6,600,938 | B1 * | 7/2003 | Suzuki | 455/567 |
| 6,754,362 | B2 * | 6/2004 | Kaiwa et al. | 381/397 |
| 6,834,744 | B2 * | 12/2004 | Toki | 181/148 |
| 6,907,955 | B2 * | 6/2005 | Masuda | 181/148 |
| 6,912,288 | B2 * | 6/2005 | Nakashima et al. | 381/190 |
| 7,050,600 | B2 * | 5/2006 | Saiki et al. | 381/388 |
| 7,076,078 | B2 * | 7/2006 | Peng | 381/388 |
| 7,080,442 | B2 * | 7/2006 | Kawamura et al. | 29/594 |
| 7,106,878 | B2 * | 9/2006 | Saiki et al. | 381/396 |
| 7,120,264 | B2 * | 10/2006 | Saiki et al. | 381/184 |
| 7,148,789 | B2 * | 12/2006 | Sadler et al. | 340/407.1 |
| 7,151,837 | B2 * | 12/2006 | Bank et al. | 381/190 |
| 7,204,009 | B2 * | 4/2007 | Kawamura et al. | 29/594 |
| 7,263,196 | B2 * | 8/2007 | Aubauer et al. | 381/332 |
| 7,316,289 | B2 * | 1/2008 | Ajiki et al. | 181/171 |
| 7,382,890 | B2 * | 6/2008 | Saiki et al. | 381/152 |

(Continued)

FOREIGN PATENT DOCUMENTS

JP 08-168037 6/1996

(Continued)

OTHER PUBLICATIONS

Communication from Japanese Patent Office regarding counterpart application.

Primary Examiner—Jeffrey Donels
Assistant Examiner—Forrest M Phillips
(74) Attorney, Agent, or Firm—Harness, Dickey & Pierce, P.L.C.

(57) ABSTRACT

An electro-optical device includes an electro-optical panel, a holding frame that holds the electro-optical panel, and a sound-production frame that is attached to the holding frame, constitutes a sound-production air space at the rear of the holding frame, and holds a sound-production unit. The holding frame is provided with an internal sound-guiding path that is connected to the inside of the sound-production air space and opens to the outside.

9 Claims, 9 Drawing Sheets

U.S. PATENT DOCUMENTS

| | | | |
|---|---|---|---|
| 7,385,482 B2 * | 6/2008 | Wada ....................... | 340/384.1 |
| 7,400,875 B2 * | 7/2008 | Konno ....................... | 455/349 |
| 7,416,048 B2 * | 8/2008 | Hongo et al. ................ | 181/199 |
| 2001/0026625 A1 * | 10/2001 | Azima et al. ................. | 381/152 |
| 2001/0028303 A1 * | 10/2001 | Kuwabara et al. ......... | 340/384.1 |
| 2001/0033224 A1 * | 10/2001 | Togawa et al. ............ | 340/384.1 |
| 2002/0075135 A1 * | 6/2002 | Bown ....................... | 340/384.1 |
| 2002/0125065 A1 * | 9/2002 | Bank .......................... | 181/161 |
| 2002/0139608 A1 * | 10/2002 | Sugiyama et al. ........... | 181/148 |
| 2003/0003879 A1 * | 1/2003 | Saiki et al. ................... | 455/90 |
| 2003/0059079 A1 * | 3/2003 | Asahina et al. ............. | 381/396 |
| 2003/0202673 A1 * | 10/2003 | Tajima et al. ............... | 381/386 |
| 2004/0081329 A1 * | 4/2004 | Huang et al. ................ | 381/334 |
| 2004/0163883 A1 * | 8/2004 | Suzuki ....................... | 181/173 |
| 2004/0252857 A1 * | 12/2004 | Lewis ......................... | 381/355 |
| 2005/0025330 A1 * | 2/2005 | Saiki et al. .................. | 381/388 |
| 2005/0205350 A1 * | 9/2005 | Yang ........................... | 181/160 |
| 2005/0265574 A1 * | 12/2005 | Holmes et al. .............. | 381/388 |
| 2006/0037807 A1 * | 2/2006 | Hongo et al. ................ | 181/199 |
| 2006/0039575 A1 * | 2/2006 | Wada ......................... | 381/152 |
| 2006/0051075 A1 * | 3/2006 | Wada ......................... | 386/126 |
| 2006/0210099 A1 * | 9/2006 | Takahata et al. ............ | 381/152 |
| 2007/0071259 A1 * | 3/2007 | Tojo ........................... | 381/152 |
| 2007/0223744 A1 * | 9/2007 | Wada ......................... | 381/152 |
| 2007/0248236 A1 * | 10/2007 | Miyata et al. ............... | 381/152 |
| 2007/0274547 A1 * | 11/2007 | Ueno ......................... | 381/306 |

FOREIGN PATENT DOCUMENTS

| | | |
|---|---|---|
| JP | 2001-156899 | 6/2001 |
| JP | 2001-168963 | 6/2001 |
| JP | 2002-063986 | 2/2002 |
| JP | 2002-077346 | 3/2002 |
| JP | 2003-179988 | 6/2003 |
| JP | 2004-336293 | 11/2004 |
| WO | WO 2004/004408 | 1/2004 |

* cited by examiner

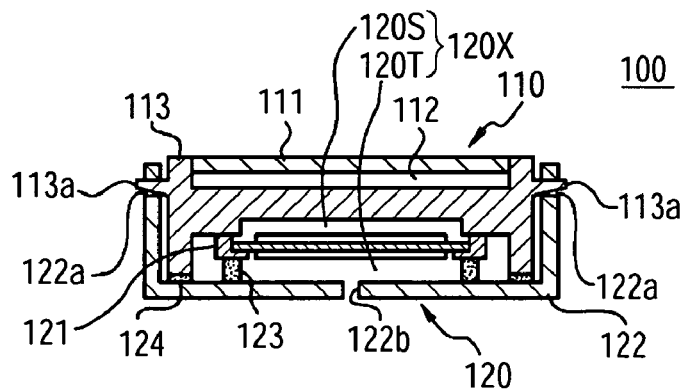
FIG. 1A
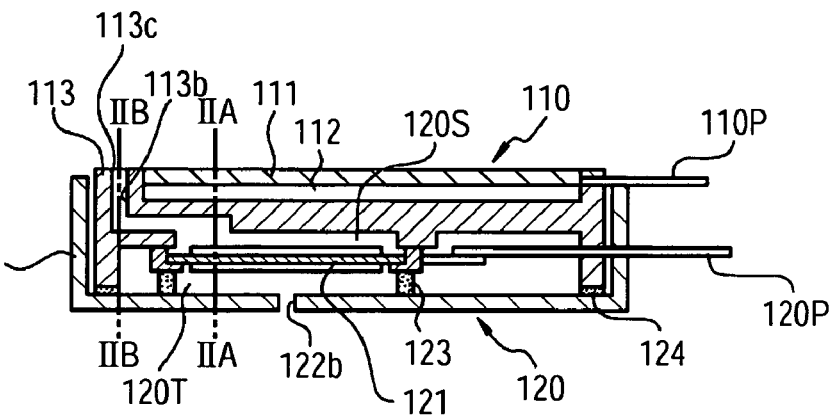
FIG. 1B
FIG. 1C  FIG. 1D
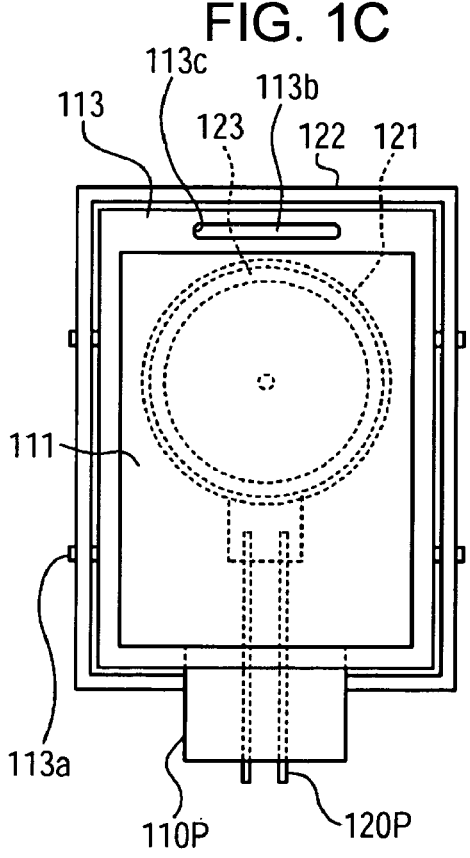
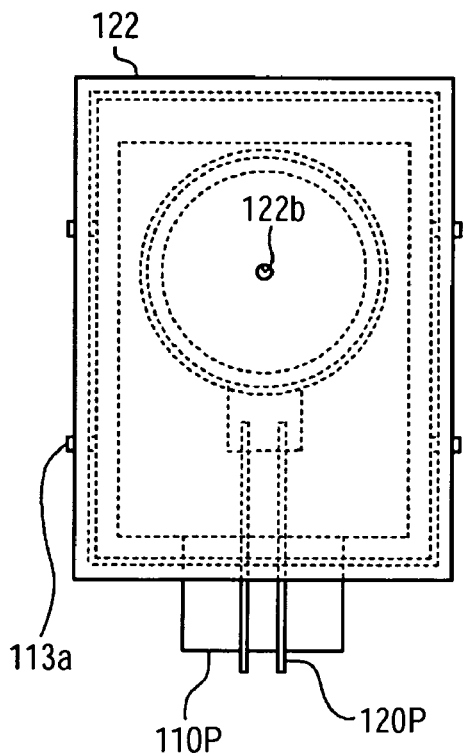

ELECTRO-OPTICAL DEVICE AND ELECTRONIC APPARATUS

RELATED APPLICATIONS

This application claims priority to Japanese Patent Application No. 2004-261987 filed Sep. 9, 2004 which is hereby expressly incorporated by reference herein in its entirety.

BACKGROUND OF THE INVENTION

1. Technical Field

The present invention relates to an electro-optical device and to an electronic apparatus. More particularly, the present invention relates to an electro-optical device that has a favorable sound-production function when being provided in a portable electronic apparatus.

2. Related Art

In general, electro-optical devices are provided in various electronic apparatuses. Further, there are many cases in which the electro-optical devices are provided in various electronic apparatuses together with sound-production units, such as speakers or the like. In an electronic apparatus according to the related art, typically, an electro-optical device (for example, a liquid crystal display device) is housed in a case, while being separated from a sound-production unit. For example, in a portable electronic apparatus, such as a cellular phone, the electro-optical device and the sound-production unit are separately mounted on a substrate that is disposed in the case (for example, see Japanese Unexamined Patent Application Publication No. 2001-168963) or the electro-optical device and the sound-production unit are directly fixed to separate places in the case (for example, see Japanese Unexamined Patent Application Publication No. 2002-77346).

Further, in order to reduce the size and the thickness of a portable electronic apparatus, as the sound-production unit mounted in the above-described electronic apparatus, a piezoelectric sound-production unit is used in which a piezoelectric vibrating body formed by laminating a vibration plate, and the piezoelectric body is fixed to the case (for example, see Japanese Unexamined Patent Application Publication No. 2002-77346).

In addition, a small electronic apparatus has been suggested in which a liquid crystal panel and a backlight device disposed at the rear of the liquid crystal panel are housed in an apparatus case, a speaker is disposed in a backlight case of the backlight device, and a sound-guiding path is provided in the backlight case so as to guide the sound from the inside of the backlight case to the sound output slot of the apparatus case (for example, see Japanese Unexamined Patent Application Publication No. 8-168037).

In recent years, with the progress of the reduction in size of portable electronic apparatuses and the increased screen size of display devices, in the structure disclosed in Japanese Unexamined Patent Application Publication No. 2001-168963 or 2002-77346, if a display section and a sound-production section are disposed in such a way that they overlap each other, the thickness of the case is inevitably increased. On the other hand, when the display section and the sound-production section need to be disposed in such a way that they do not overlap each other to reduce the thickness of the case, there is problem in that the size of the apparatus is inevitably increased.

Further, in the structure disclosed in Japanese Unexamined Patent Application Publication No. 2001-168963 or 2002-77346, when the sound-production unit is disposed in the electronic apparatus, acoustic design in the vicinity of the sound-production unit needs to be performed for each case. Accordingly, the design of the case may be restricted. Further, there is a problem in that a sufficient reduction in size or thickness of the case cannot be achieved.

In addition, in the configuration disclosed in Japanese Unexamined Patent Application Publication No. 8-168037, since the speaker is disposed in the backlight case, the sound-production space of the speaker is restricted by the structure of the backlight case, and thus optimum acoustic design is difficult to perform. On the other hand, in view of the acoustic effect when the backlight case is designed, there is a problem in that the optimization of the optical characteristics of the backlight is difficult to achieve.

SUMMARY

An advantage of the invention is that it provides an electro-optical device in which an electro-optical panel and a sound-production unit can be provided compactly. Further, another advantage of the invention is that it provides an electro-optical device in which acoustic design of a sound-production unit can be independently performed, such that, when the electro-optical device is provided in an electronic apparatus or the like, an influence on sound by circumstances can be eliminated and an influence on sound by the configuration of an internal display can be not exerted.

According to a first aspect of the invention, an electro-optical device includes an electro-optical panel, a holding frame that holds the electro-optical panel, and a sound-production frame that is attached to the holding frame, constitutes a sound-production air space at the rear of the holding frame, and holds a sound-production unit. The holding frame is provided with an internal sound-guiding path that is connected to the inside of the sound-production air space and opens to the outside.

In accordance with the first aspect of the invention, the holding frame for holding the electro-optical panel and the sound-production frame for holding the sound-production unit are attached to each other, and the holding frame is provided with the internal sound-guiding path that is connected to the inside of the sound-production air space and opens to the outside. The sound waves generated by the sound-production unit, which is disposed in the sound-production air space, are emitted to the outside via the internal sound-guiding path provided in the holding frame.

At this time, since the sound-production unit is held by the holding frame at the rear of the electro-optical panel, an electro-optical device having a sound-production function can be constituted compactly. Further, the sound-production air space for housing the sound-production unit is constituted, and thus an influence on sound by circumstances can be reduced. In addition, since the sound-production air space is disposed at the rear of a display unit, an influence on sound by the internal configuration of the electro-optical panel can be reduced. Accordingly, acoustic design can be performed independently with no external influence or with no influence on sound by the internal structure of the electro-optical panel. Therefore, an influence on sound by the design or internal configuration of a case of an electronic apparatus, in which the electro-optical device is mounted, can be reduced, such that the design of the electronic apparatus, in which the electro-optical device is mounted, can be performed unlimitedly. As a result, a degree of freedom for the internal structure of the electro-optical panel can also be increased.

In the electro-optical device according to the first aspect of the invention, it is preferable that the internal sound-guiding path open at a front surface or a side surface of the holding frame. According to this configuration, since the internal sound-guiding path provided in the holding frame opens at the front surface or the side surface of the holding frame via the internal sound-guiding path, the sound waves generated in the sound-production air space are emitted to the front or the side of the holding frame. Therefore, when the electro-optical device is mounted in the electronic apparatus or the like, sound can be emitted to a display screen of the electro-optical panel, such that the sound can be efficiently used.

In the electro-optical device according to the first aspect of the invention, it is preferable that the holding frame have a rear surface wall disposed at the rear of the electro-optical panel and the sound-production air space be constituted between the rear surface wall and the sound-production frame. According to this configuration, since the rear surface wall of the holding frame is interposed between the electro-optical panel and the sound-production air space, an influence on sound by the internal structure of the electro-optical panel can be eliminated.

The electro-optical device according to the first aspect of the invention may further include a support member that is interposed between the holding frame and the sound-production frame so as to define the sound-production air space. According to this configuration, since the sound-production air space can be constituted between the holding frame and the sound-production frame via the support member, the structure of the sound-production air space and airtightness can be secured. Therefore, the sound-production air space can be designed without being restricted by the structure of the holding frame or the sound-production frame. Further, a degree of freedom for the structural size of the holding frame or the sound-production frame, or the attaching and fixing structure of the holding frame and the sound-production frame can be secured.

In the electro-optical device according to the first aspect of the invention, it is preferable that an air space between the holding frame and the sound-production unit and an air space between the sound-production frame and the sound-production unit be separated from each other by the support member and the sound-production unit. According to this configuration, since the air space between the holding frame and the sound-production unit and the air space between the sound-production frame and the sound-production unit are separated from each-other, sound generated by the sound-production unit can be efficiently emitted via the internal sound-guiding path.

Further, in the electro-optical device according to the first aspect of the invention, it is preferable that the sound-production unit overlap the electro-optical panel in plan view. By doing so, the planar size of the electro-optical device can be constituted compactly.

In the electro-optical device according to the first aspect of the invention, it is preferable that the internal sound-guiding path open at a position where the sound-production unit and the electro-optical panel do not overlap each other. According to this configuration, a degree of freedom for the position of an opening is increased and the positional relationship with the electro-optical panel is also made free. Therefore, manufacturing design can be easily performed, without sacrificing the compactness of the device.

Next, according to a second aspect of the invention, an electronic apparatus includes the electro-optical device described above, and a support body that supports the electro-optical device. In accordance with the second aspect of the invention, the electro-optical device is mounted in the electronic apparatus, while being supported by the support body.

As the support body, the case of the electronic apparatus, a frame attached to the case, an internal attaching member or buffering member attached to the case or frame, a combined structure-of them, or the like can be exemplified. As an electronic apparatus, in particular, a portable electronic apparatus that is needed to be reduced in size is effectively used. As the portable electronic apparatus, a cellular phone, a portable information terminal, an electronic watch, or the like can be exemplified. Further, in general, the electronic apparatus according to the second aspect of the invention may further include a control unit that controls the electro-optical device described above.

In the electronic apparatus according to the second aspect of the invention, it is preferable that an external sound-guiding path be provided between the electro-optical device and the support body so as to be connected to the internal sound-guiding path, and the external sound-guiding path open at a surface near the electro-optical panel. According to this configuration, the external sound-guiding path that is connected to the internal sound-guiding path provided in the electro-optical device is provided between the electro-optical device and the support member, and thus a degree of freedom for the formation position of the internal sound-guiding path is increased. Accordingly, the electro-optical device can be further reduced in size and the degree of freedom for acoustic design can be increased. Here, it is preferable that the external sound-guiding path open near the display unit of the electro-optical device. According to this configuration, sound can be guided toward the front surface of the electronic apparatus, that is, toward the display unit, such that the sound can be easily heard. In particular, in the electro-optical device, it is most preferable that the internal sound-guiding path open at the side surface of the holding frame and the external sound-guiding path causes the sound to be guided from the opening on the side surface toward the front surface of the electronic apparatus. In this case, there is no case in which the compactness of the electronic apparatus or utilization efficiency of the sound may be sacrificed.

In the electronic apparatus according to the second aspect of the-invention, it is preferable that the external sound-guiding path is constituted by a sound-guiding member that is disposed between the electro-optical device and the support body. In general, the support body of the electronic apparatus has a support function to the electro-optical device, but it needs to satisfy external appearance design, strength, buffering capability, and the like. Accordingly, there is a case in which manufacturing costs are increased, even when the support body having a material or shape most suitable for increasing sound-guiding capability is provided or since the support body having such a material or shape is provided. For this reason, an additional sound-guiding member is disposed between the electro-optical device and the support body so as to guide the sound, such that sound-guiding capability can be enhanced, without restricting the support body. In this case, the sound-guiding member may constitute the external sound-guiding path together with the electro-optical device or may constitute the external sound-guiding path together with the support body. Preferably, a sound-guiding path is provided in the sound-guiding member itself so as to be connected to the internal sound-guiding path.

Moreover, in the electro-optical device according to the first aspect of the invention or the electronic apparatus according to the second aspect of the invention, it is preferable that the sound-production unit be a piezoelectric sound-production unit. In such a manner, by using the piezoelectric sound-production unit, the electro-optical device can be further reduced in size and thickness.

Further, it is preferable that the holding frame and the sound-production frame be detachably attached and fixed to each other. By doing so, a portion having the display unit and a portion having the sound-production unit can be separated from each other, and thus an assembling work or maintenance of the electro-optical device can be easily performed. As a detachable attaching and fixing structure, a hook engagement, press-fit fixing, screw fixing, or the like can be exemplified.

BRIEF DESCRIPTION OF THE DRAWINGS

The invention will be described with reference to the accompanying drawings, wherein like numbers reference like elements, and wherein:

FIG. 1A is a cross-sectional view of an electro-optical device according to a first embodiment of the invention;

FIG. 1B is a cross-sectional view of the electro-optical device according to the first embodiment of the invention;

FIG. 1C is a plan view of the electro-optical device according to the first embodiment of the invention;

FIG. 1D is a bottom view of the electro-optical device according to the first embodiment of the invention;

DESCRIPTION OF THE EMBODIMENTS

Figure 2A:
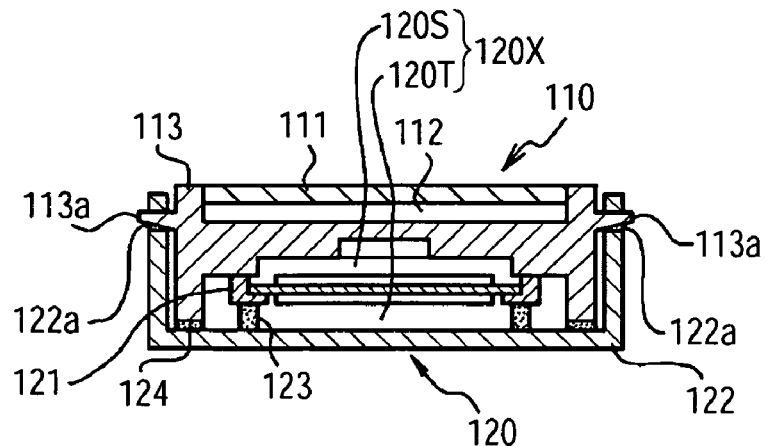
FIG. 2A is a cross-sectional view of the electro-optical device according to the first embodiment of the invention.

Next, embodiments of the invention will be described in detail with reference to the accompanying drawings. Here, the respective embodiments described below are just examples of the invention and the descriptions thereof are not intended to limit the invention.

First Embodiment

FIG. 1A is a cross-sectional view taken along one direction (short-side direction) of an electro-optical device 100 according to the present embodiment. FIG. 1B is a cross-sectional view taken along the other direction (long-side direction) of the electro-optical device 100. FIG. 1C is a plan view of the electro-optical device 100. FIG. 1D is a bottom view of the electro-optical device 100. The electro-optical device 100 includes a display section 110 that has an electro-optical panel 111 and a sound-production section 120 that has a sound-production unit 121.

The electro-optical panel 111 is constituted by any one of various electro-optical panels, such as a liquid crystal display panel, an organic electroluminescent panel, a plasma display panel, a field emission panel, and the like. In the present specification, it is assumed that a liquid crystal display panel is used. A backlight 112 that illuminates the electro-optical panel 111 from the back is disposed in the display section 110. Moreover, when a self-emitting-type panel is used as the electro-optical panel 111, instead of the liquid crystal display panel, a backlight needs not be used.

A holding frame 113 is provided in the display section 110, and a display unit having the electro-optical panel 111 and the backlight 112 is held and fixed by the holding frame 113. A wiring line member 110P constituted by a flexible wiring board or the like is connected to the display section 110 and is led outside the holding frame 113. The wiring line member 110P supplies power or control signals to the electro-optical panel 111 or the backlight 112.

Figure 2B:
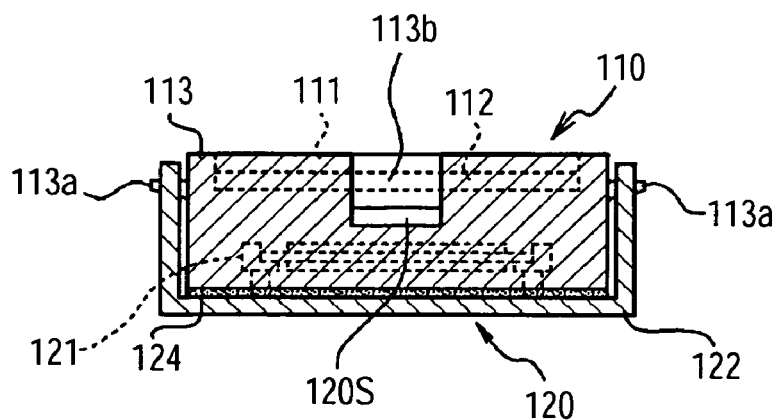
FIG. 2B is a cross-sectional view of the electro-optical device according to the first embodiment of the invention.
Figure 2C:
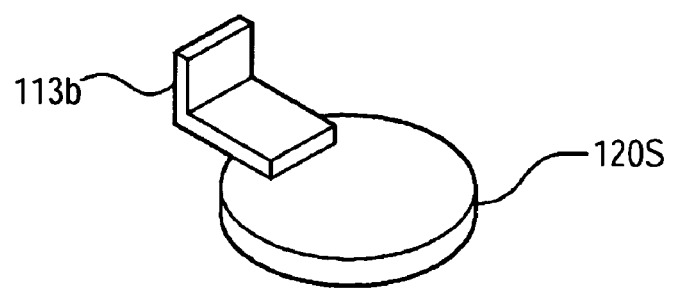
FIG. 2C is a schematic perspective view showing an upper space of a sound-production air space and a spatial shape of an internal sound-guiding path.

In the holding frame 113, an internal sound-guiding path 113b, which is connected to a sound-production air space 120X to be described below and opens to the outside, is provided. The internal sound-guiding path 113b opens at the front surface where the display surface of the electro-optical panel 111 is exposed. FIG. 2A is a cross-sectional view schematically showing a portion where the internal sound-guiding path 113b is formed, taken along the line IIA-IIA of FIG. 1A. FIG. 2B is a cross-sectional view schematically showing a portion where the internal sound-guiding path 113b is formed, taken along the line IIB-IIB of FIG. 1B. FIG. 2C is a perspective view schematically showing an upper space 120S of the sound-production air space 120X and a spatial shape of the internal sound-guiding path 113b. In these drawings, the internal sound-guiding path 113b advances laterally from a connection portion to the upper space 120S of the sound-production air space 120X (see FIG. 1A) disposed at the rear of a display unit (the electro-optical panel 111 and the backlight 112) and is bent halfway to extend to the front surface of the display section 110. At this time, the internal sound-guiding path 113b is connected to the upper surface of the upper space 120S. Then, the internal sound-guiding path 113b passes through a side of the electro-optical panel 111 and the backlight 112 (the display unit) of the display section 110 and opens at the front surface of the display section 110 on the electro-optical panel 111.

In the sound-production section 120, a sound-production unit 121 and a sound-production frame 122, which is attached to the holding frame 113 to constitute the sound-production air space 120X for housing the sound-production unit 121, are provided. The sound-production unit 121 is a sound source that generates sound waves and is preferably constituted by a piezoelectric vibrating body, as described below. The sound-production frame 122 houses the sound-production unit 121 and is detachably fixed to the holding frame 113 of the display section 110. More specifically, engaging protrusions 113*a* are provided on the outer surfaces of the holding frame 113 and engaging openings 122*a* are provided in the side walls of the sound-production frame 122. The engaging protrusions 113*a* are engaged with (fitted into) the engaging openings 122*a*, such that the sound-production frame 122 is detachably attached and fixed to the holding frame 113. Further, a wiring line member 120P is connected to the sound-production section 120 and is led outside the sound-production frame 122. The wiring line member 120P supplies a driving signal to the sound-production unit 121.

The sound-production unit 121 is supported to the sound-production frame 122 by a support member 123 and is fixed to the holding frame 113 while being supported thereto. Here, in order to ensure ease of assembly, preferably, the sound-production unit 121 is fixed only to the holding frame 113 or is fixed only to the sound-production frame 122 via the support member 123. The support member 123 is disposed in a closed curved shape (in the drawing, a ring shape) between the sound-production unit 121 and the sound-production frame 122 and divides the sound-production air space 120X into the upper space 120S and a lower space 120T. The support member 123 is preferably made of an elastic material or a buffering material, such as synthetic resin or flexible synthetic resin (for example, urethane foam), such that rattling does not occur between the sound-production unit 121, and the holding frame 113 and the sound-production frame 122. Moreover, the present invention is not limited to the present embodiment. Rattling generated between the sound-production unit 121, and the holding frame 113 and the sound-production frame 122 causes undesirable noise and loss of vibration energy of the sound-production unit 121, and thus it is preferable to reduce rattling as much as possible.

A support member 124 is interposed between the holding frame 113 and the sound-production frame 122. The support member 124 is disposed in a closed curved shape (in the drawing, a ring shape) between the holding frame 113 and the sound-production frame 122 and constitutes the sound-production air space 120X for housing the sound-production unit 121. The support member 124 is preferably made of an elastic material or a buffering material, such as synthetic resin or flexible synthetic resin (for example, urethane foam), such that rattling does not occur between the holding frame 113 and the sound-production frame 122. Moreover, the present invention is not limited to the present embodiment. Rattling of a support body constituted by the holding frame 113 and the sound-production frame 122 causes undesirable noise and loss of vibration energy of the sound-production unit 121, and thus it is preferable to reduce rattling as much as possible.

Figure 8A:
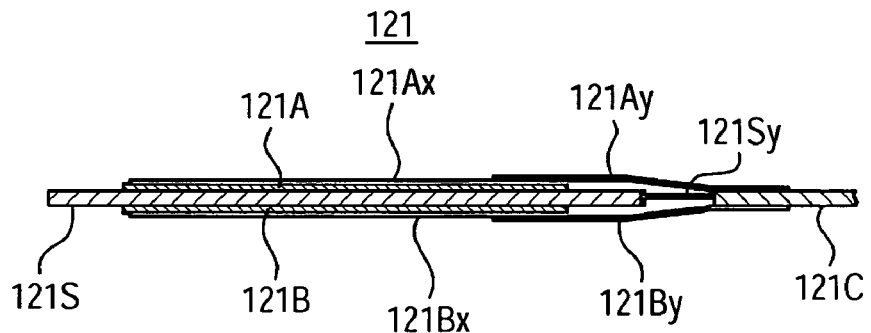
FIG. 8A is a cross-sectional view showing a structure of a piezoelectric vibrating body of a sound-production unit.
Figure 8B:
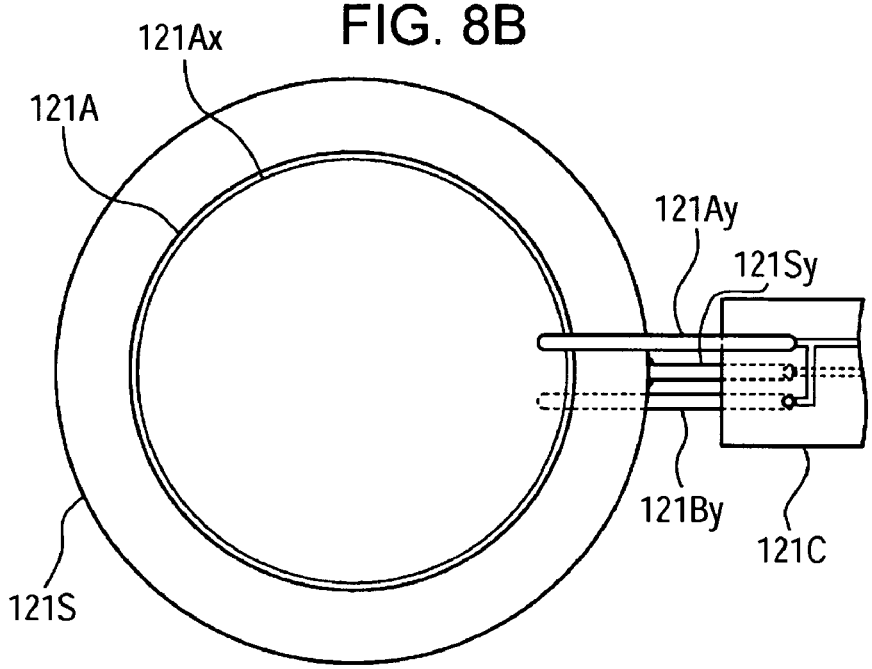
FIG. 8B is a plan view showing the structure of the piezoelectric vibrating body of the sound-production unit.

The sound-production unit 121 includes a piezoelectric vibrating body that constitutes a main body of a piezoelectric speaker, for example. As shown in FIGS. 8A and 8B, the piezoelectric vibrating body is a laminate of a vibration plate 121S (shim plate) made of stainless steel or the like, and piezoelectric bodies 121A and 121B. The sound-production unit 121 is made by fixing the sound-production unit to a support frame 121D shown in FIG. 8C. FIGS. 8A and 8B show a bimorph piezoelectric vibrating body in which the piezoelectric bodies 121A and 121B are laminated on front and back sides of the vibration plate 121S. Of course, a unimorph piezoelectric vibrating body may be used.

On the surfaces of the piezoelectric bodies 121A and 121B, electrodes 121Ax and 121Bx made of metal films of gold (Au) or the like, are formed. Conductive pieces 121Ay and 121By made of aluminum or the like are connected to the electrodes 121Ax and 121Bx, respectively. The conductive pieces 121Ay and 121By are connected to a wiring line member 121C, such as a flexible wiring board or the like. Further, a conductive piece 121Sy is connected to the vibration plate 121S and, similarly, is connected to the wiring line member 121C. The wiring line member 121C is connected to the wiring line member 120P. Moreover, the wiring line member 121C and the wiring line member 120P may be integrally formed.

Figure 8C:
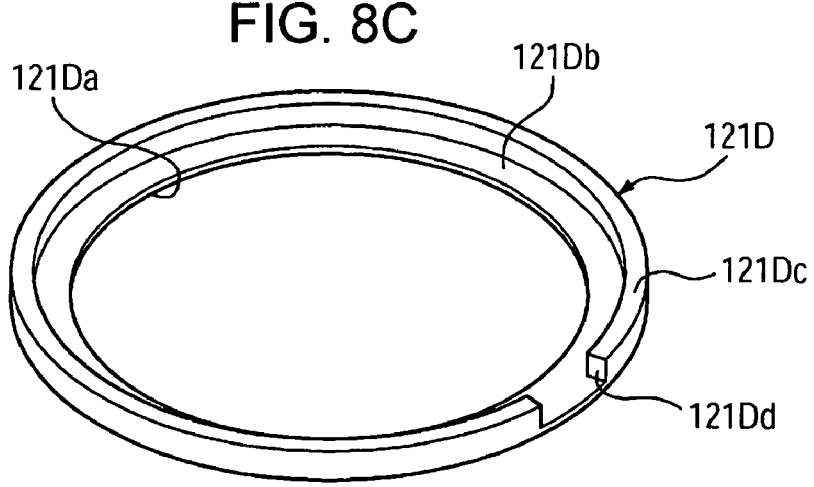
FIG. 8C is a schematic perspective view showing the shape of a support frame.

The support frame 121D is made of synthetic resin or the like as a single body. Referring to FIG. 8C, the support frame 121D is constituted by a ring-shaped body having an L-shaped section. In the support frame 121D, a ring-shaped support surface 121Db is provided in the vicinity of an opening 121Da inside the support frame 121D, and an outer frame 121Dc is provided outside the support surface 121Db. On the support surface 121Db, an outer circumference of the vibration plate 121S is disposed and fixed thereto by an appropriate adhesive or the like. A notch portion 121Dd is formed in a portion of the outer frame 121Dc of the support frame 121D, and the conductive pieces 121Ay, 121By, and 121Sy are inserted into the notch portion 121Dd to be led to the outside. At this time, the conductive pieces 121Ay, 121By, and 121Sy are preferably fixed by an insulating material (not shown), which is filled inside the notch portion 121Dd.

In the present specification, the sound-production air space 120X means a space in which the sound-production unit 121 is housed and sound waves are directly generated by the vibration of the sound-production unit 121. In the drawings, the entire outer circumference of the sound-production unit 121 is fixed airtight to the holding frame 113 and the sound-production frame 122, and thus the sound-production air space 120X is divided into the upper space 120S that exists between the sound-production unit 121 and the bottom surface of the holding frame 113 and the lower space 120T that exists between the sound-production unit 121 and the sound-production frame 122.

The upper space of the sound-production air space 120X is connected to an overlying sound releasing hole 113*c* via the internal sound-guiding path 113*b* provided in the holding frame 113. The sound generated by the vibration of the sound-production unit 121 is emitted above the display section 110 from the sound releasing hole 113*c* to be used.

Further, an air inlet 122*b* is provided in an opposing inner surface portion 122*y*. As shown in the drawing, a single air inlet 122*b* may be formed. Alternatively, the air inlet 122*b* may be constituted by a plurality of small holes. Here, if the air inlet 122*b* is not provided, the lower space of the sound-production air space 120X becomes a closed space. In this case, if the volume of the lower space is not sufficiently large, the pressure of air in the lower space is increased by the vibrations when the vibration amplitude of the vibration plate is increased. If doing so, the vibration amplitude of the vibration plate is depressed due to the pressure, and thus the volume of the sound may not be turned up. If the air inlet 122*b* is formed in the lower space, even when the vibration amplitude of the vibration plate is increased, there is no case in which the vibration amplitude of the vibrating plate is depressed, since air moves via the air inlet 122*b*. At this time, sound is generated from the air inlet 122*b*, but this sound is not used.

Moreover, if the lower space has a sufficient volume, the air inlet 122b need not be provided. Further, the acoustic effect of the sound-production section 120 is suitably designed by adjusting the shape or volume of the sound-production air space 120X and the shape or volume of the upper space 120S or the lower space 120T.

Further, in the present embodiment, the sound-production unit 121 is disposed to overlap the display unit having the electro-optical panel 111 and the backlight 112 in plan view. More specifically, the entire sound-production unit 121 overlaps the display unit in plan view. Accordingly, the planar size of the electro-optical device 100 can be made small. In the present invention, at least a portion of the sound-production unit 121 may overlap the display unit in plan view. That is, the portion of the sound-production unit 121 may be disposed so as to be found out from the display unit.

In the present embodiment, the display section 110 having the electro-optical panel 111 and the sound-production section 120 are integrally constituted, and thus a compact electro-optical device 100 can be implemented. Further, since the electro-optical panel and the sound-production unit do not need to be separately mounted in an electronic apparatus, unlike the related art, various electronic apparatuses, in which the electro-optical device 100 is mounted, can be reduced in size or thickness. In particular, at least a portion of the sound-production unit 121 is disposed to overlap the display unit held by the holding frame 113 in plan view, and thus the planar size can be made small. Further, the sound-production frame 122 is attached and fixed to the holding frame 113 from the back, and the sound-production air space 120X is constituted between the holding frame 113 and the sound-production frame 122. Therefore, the device as a whole can be reduced in thickness, even when the display section 110 and the sound-production section 120 overlap each other.

Further, the acoustic effect of the sound-production section 120 is determined by the structure of the electro-optical device 100, that is, the structure of the sound-production air space 120X, and thus the acoustic effect can be prevented from changing according to the arrangement of the sound-production unit in the electronic apparatus or peripheral structures, unlike the related art. Therefore, acoustic design can be easily achieved and stable sound characteristics can be obtained even when the sound-production unit is mounted in any electronic apparatus.

In addition, the sound-production air space 120X is constituted between the rear surface wall of the holding frame 113 provided at the rear of the display unit and the sound-production unit 121, and thus the influence of the internal structure of the display unit on the acoustic effect of the sound-production section 120 can be eliminated. Therefore, a structural restriction relating to the internal structure of the display unit can also be eliminated and the acoustic design of the sound-production section 120 can be further easily achieved. In the present invention, a member constituting a portion of the display unit (in the drawing, a light guiding plate or a reflecting plate) may directly face the sound-production air space 120X from the front surface thereof. In this case, the rear surface wall does not need to be provided in the holding frame 113.

Moreover, in the above-described embodiment, the sound-production unit 121 is supported on the holding frame 113 while directly contacting the holding frame 113. In this case, the contact portion of the sound-production unit 121 and the holding frame 113 may be constituted in a closed curve shape (ring shape) and the upper space 120S may be defined by the sound-production unit 121 and the holding frame 113. Alternatively, a noncontact portion may be provided between the sound-production unit 121 and the holding frame 113, and thus the upper space 120S may extend to the periphery thereof via the noncontact portion, such that the upper space 120S can be defined by the sound-production unit 121, the holding frame 113, and the support member 123. In this case, a bar-shaped support member (not shown) may be interposed between the sound-production unit 121 and the holding frame 113, while the sound-production unit 121 and the holding frame 113 do not directly contact each other.

Second Embodiment

Figure 3A:
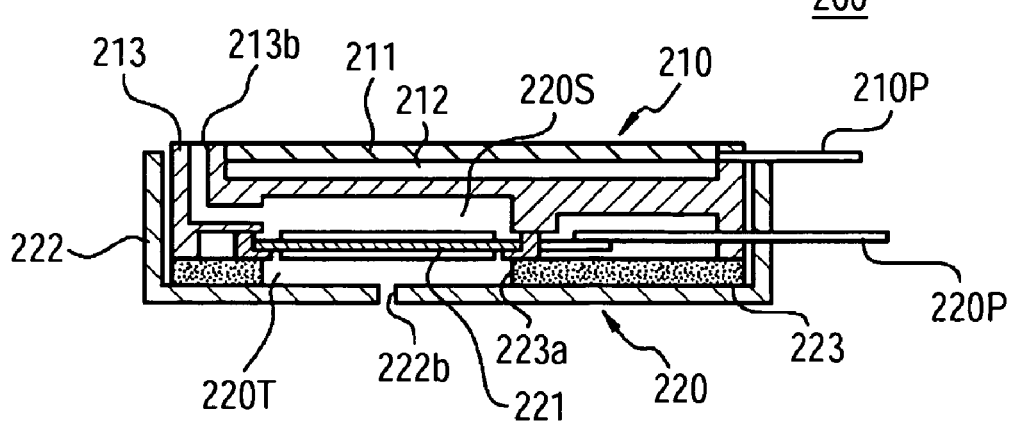
FIG. 3A is a cross-sectional view of an electro-optical device according to a second embodiment of the invention.
Figure 3B:
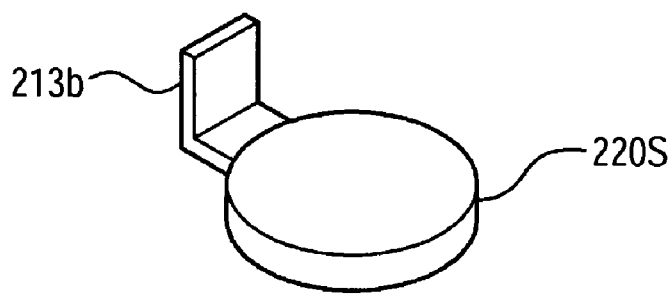
FIG. 3B is a schematic perspective view showing an upper space of a sound-production air space and a spatial shape of an internal sound-guiding path.
Figure 3C:
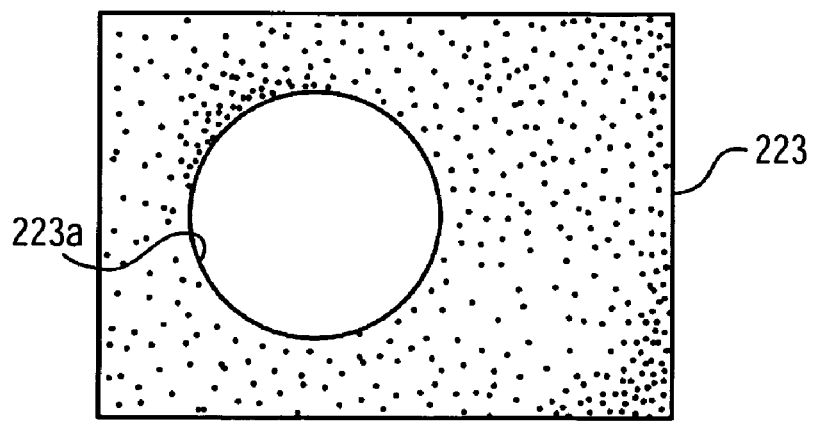
FIG. 3C is a plan view of a support member.

Next, a second embodiment according to the invention will be described with reference to FIGS. 3A to 3C. FIG. 3A is a cross-sectional view taken along one direction (short-side direction) of an electro-optical device 200 according to the second embodiment of the invention. FIG. 3B is a schematic perspective view showing an upper space of a sound-production air space and the spatial shape of an internal sound-guiding path. FIG. 3C is a plan view showing the planar shape of a support member. In the present embodiment, other parts, which are not shown in FIGS. 3A to 3C, can be constituted similarly to those in the above-described first embodiment and thus the descriptions thereof will be omitted.

The electro-optical device 200 of this embodiment includes a display section 210 having an electro-optical panel 211 and a sound-production section 220 having a sound-production unit 221. Here, the electro-optical panel 211, a backlight 212, a holding frame 213, the sound-production unit 221, and a sound-production frame 222 are basically the same as those in the first embodiment and thus the descriptions thereof will be omitted.

In this embodiment, a support member 223 is interposed between the holding frame 213 and the sound-production unit 221, and the sound-production frame 222 as a single body. That is, the support member 223 is interposed between the holding frame 213 and the sound-production frame 222, and the support member 223 is also interposed between the sound-production unit 221 and the sound-production frame 222. The support member 223 has a planar shape shown in FIG. 3C as a single body, and an opening 223a is provided inside the planar shape to pass through the support member 223 in a thicknesswise direction thereof. As shown in FIG. 3A, the opening 223a is disposed between a vibration side of the sound-production unit 221 and the sound-production frame 222, which directly face each other. Then, a lower space 220T is constituted between the holding frame 213 and the sound-production frame 222 that face each other with the support member 223 interposed therebetween. That is, the lower space 220T is provided inside the opening 223a.

Moreover, in this embodiment, an upper space 220S provided between the holding frame 213 and the sound-production unit 221 is also connected to the internal sound-guiding path 213b provided in the holding frame 213, such that the spatial shape shown in FIG. 3B is constituted. In this embodiment, unlike the first embodiment, the internal sound-guiding path 213b is connected to an outer circumference of the upper space 220S.

Third Embodiment

Figure 4A:
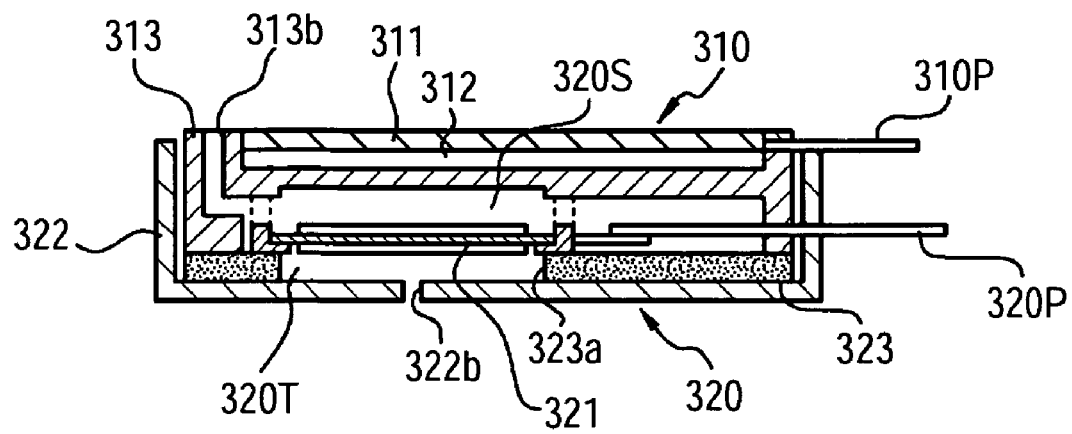
FIG. 4A is a cross-sectional view of an electro-optical device according to a third embodiment of the invention.
Figure 4B:
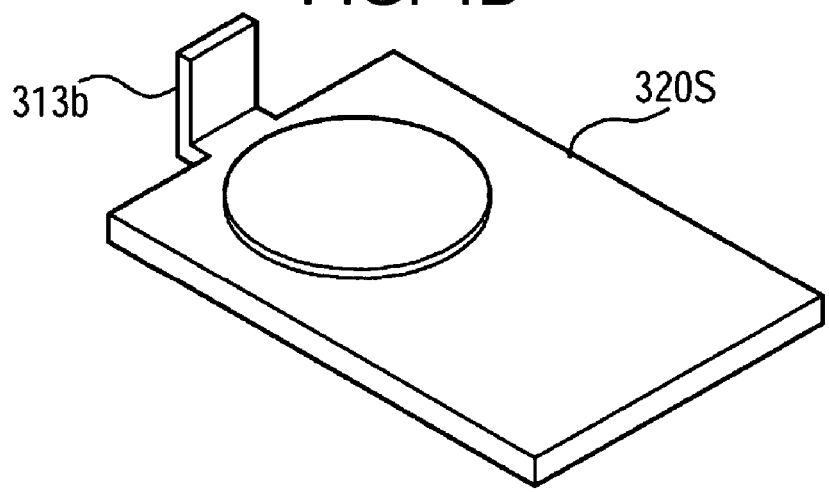
FIG. 4B is a schematic perspective view showing an upper space of a sound-production air space and a spatial shape of an internal sound-guiding path.

Next, a third embodiment according to the invention will be described with reference to FIGS. 4A and 4B. FIG. 4A is a cross-sectional view taken along one direction (short-side direction) of an electro-optical device 300 according to the third embodiment of the invention. FIG. 4B is a schematic perspective view showing an upper space of a sound-production air space and the spatial shape of an internal sound-guiding path. In the present embodiment, other parts, which are not shown in FIGS. 4A and 4B, can be constituted similarly to those in the above-described second embodiment and thus the descriptions thereof will be omitted.

The electro-optical device 300 of this embodiment includes a display section 310 having an electro-optical panel 311 and a sound-production section 320 having a sound-production unit 321. Here, the electro-optical panel 311, a backlight 312, the sound-production unit 321, a sound-production frame 322, and a support member 323 are substantially the same as those in the second embodiment and thus the descriptions thereof will be omitted.

In this embodiment, a holding frame 313 and the sound-production unit 321 do not directly contact each other, and the sound-production unit 321 is fixed onto an inner surface of the sound-production frame 322 via the support member 323. The support member 323 is fixed to an outer circumference of the sound-production unit 321 and divides the sound-production air space for housing the sound-production unit 321 into an upper space 320S and a lower space 320T. Therefore, the upper space 320S is defined by a rear surface wall of the holding frame 313, the sound-production unit 321, and the support member 323, thereby extending above the sound-production unit 321 and to the periphery thereof. The upper space 320S is connected to an internal sound-guiding path 313b provided in the holding frame 313, and the internal sound-guiding path 313b passes through a side of the display unit and opens toward the front surface of the display unit. On the other hand, the lower space 320T is defined by the sound-production unit 321, the sound-production frame 322, and the support member 323 and opens to the outside via a sound releasing hole 322b.

In this embodiment, the large upper space 120S can be secured, as shown in FIG. 4B, and thus this embodiment is effective when the large volume of an air space near the internal sound-guiding path 313b of the sound-production unit 321 needs to be secured. Specifically, the required volume of the air space can be secured and the device can be constituted compactly as a whole.

Moreover, in the present embodiment, as shown in a dotted line in FIG. 4A, a bar-shaped support member may be interposed between the sound-production unit 321 and the inner surface (the rear surface wall) of the holding frame 313.

Fourth Embodiment

Figure 5A:
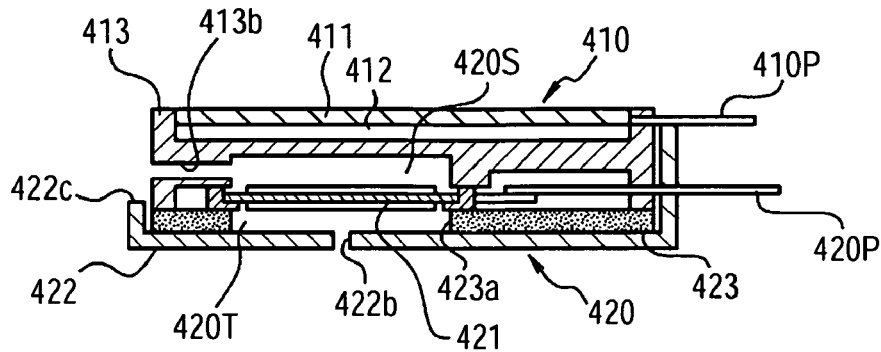
FIG. 5A is a cross-sectional view of an electro-optical device according to a fourth embodiment of the invention.
Figure 5B:
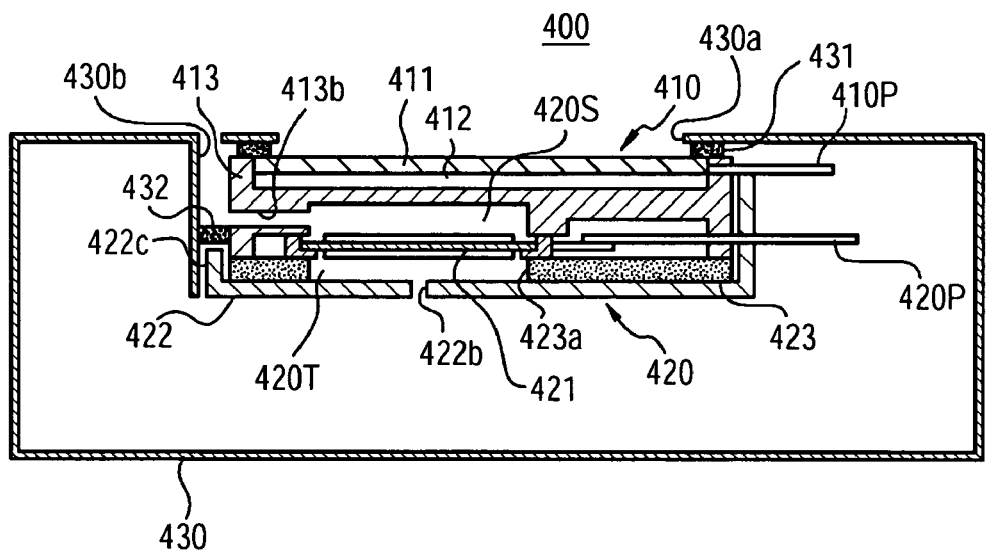
FIG. 5B is a cross-sectional view of the electro-optical device according to the fourth embodiment of the invention in a state in which the electro-optical device is attached to a case.
Figure 5C:
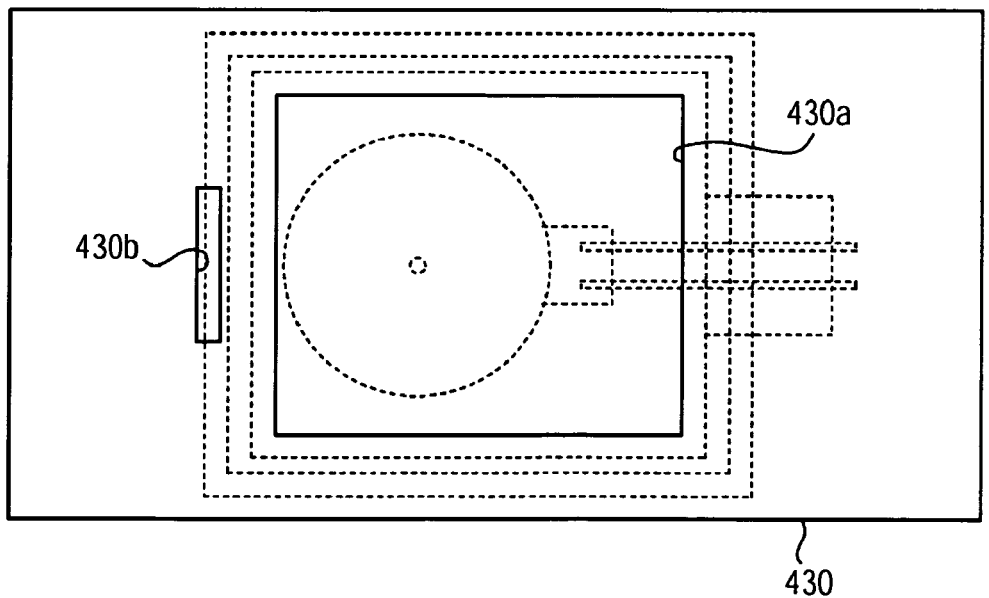
FIG. 5C is a plan view of the electro-optical device according to the fourth embodiment of the invention in a state in which the electro-optical device is attached to the case.

Next, a fourth embodiment according to the invention will be described with reference to FIGS. 5A to 5C. In this embodiment, an example of an electronic apparatus (for example, a display device) having an electro-optical device and a case to which the electro-optical device is attached is described. FIG. 5A is a cross-sectional view taken along one direction (short-side direction) of an electro-optical device according to the fourth embodiment of the invention. FIG. 5B is a schematic cross-sectional view of the electronic apparatus in which the electro-optical device according to the fourth embodiment of the invention is attached to the case. FIG. 5C is a schematic plan view of the electronic apparatus. In the present embodiment, other parts, which are not shown in FIGS. 5A to 5C, can be constituted similarly to those in the above-described second embodiment and thus the descriptions thereof will be omitted.

In this embodiment, the electro-optical device 400 to be provided includes a display section 410 having an electro-optical panel 411 and a sound-production section 420 having a sound-production unit 421. Here, the electro-optical panel 411, a backlight 412, a holding frame 413, the sound-production unit 421, and a support member 423 are the substantially same as those in the second embodiment and thus the descriptions thereof will be omitted.

This embodiment has the configuration in which an internal sound-guiding path 413b provided in the holding frame 413 is connected to an upper space 420S of a sound-production air space and opens to the outside, like the above-described embodiments, as shown in FIG. 5A. However, this embodiment is different from the above-described embodiments in that an opening of the internal sound-guiding path 413b is formed at the side surface of the holding frame 413, not the front surface of the holding frame 413 (that is, the internal sound-guiding path 413b opens laterally).

Further, since the internal sound-guiding path 413b opens at the side surface of the holding frame 413, a side wall 422c of the sound-production frame 422 is provided to be kept away from the opening of the internal sound-guiding path 413b. The side wall 422c may be constituted so as not to cover the opening of the internal sound-guiding path 413b. For example, the side wall 422c may have a notch so as to be kept away from the internal sound-guiding path 413b. Further, a front end of the side wall 422c may be formed at a position lower than the opening of the internal sound-guiding path 413b.

On the other hand, as shown in FIGS. 5B and 5C, in the electronic apparatus 400 in which the electro-optical device is attached to the case, the electro-optical device is supported and fixed to the case 430 serving as a support body. In the case 430, a display window 430a, through which the display surface of the electro-optical panel 411 is exposed, is formed, such that the display screen of the electro-optical panel 411 can be viewed from the outside through the display window 430a. At this time, the front surface of the holding frame 413 contacts an opening circumferential inner surface of the display window 430a of the case 430 via a support member 431. The support member 431 can be made of the same material as that of the support member 123 or 124 in the first embodiment. In this case, the electro-optical device may be fixed to the case 430 via the support member 431. Alternatively, the electro-optical device may be supported by a support body, other than the case 430, in other portions, and the electro-optical device may be pressed to the opening circumferential inner surface of the display window 430a via the support member 431 (that is, the electro-optical device and the opening circumferential inner surface the display window 430a separably contact each other).

In addition, in the case 430, an external sound-guiding path 430b that is connected to the internal sound-guiding path 413b of the electro-optical device is provided. The external sound-guiding path 430b is constituted to extend from the opening of the internal sound-guiding path 413b up to the opening (sound releasing hole) of the case 430 provided near the display section 410. Then, sound emitted from the internal sound-guiding path 413b is guided to the front surface of the case 430 (in the periphery of the surface in which the display window 430a is formed) and is emitted to the outside therefrom.

In the present embodiment, the periphery of a space outside the opening of the internal sound-guiding path 413b is divided by a portion of the case 430, excluding an outer surface of the holding frame 413, and a sound-guiding member 432 is disposed below the internal sound-guiding path 413b so as to close the lower portion of the space, such that the external sound-guiding path 430b is defined. The periphery of the space outside the opening of the internal sound-guiding path 413b and the lower portion of the space may be divided by a portion of the case 430, without using the sound-guiding member 432. Further, the lower portion of the space may be constituted so as to be closed by the side wall 422c of the sound-production frame 422. In addition, the external sound-guiding path 430b may be defined by other support bodies, such as a frame (constituted inside the case 430), other than the case 430.

Moreover, the sound-guiding member 432 can be made of the same material as that of the support member 123 or 124 in the first embodiment. Alternatively, the sound-guiding member 432 may be made of synthetic resin or a metal, like the case 430.

According to the present embodiment, in the electro-optical device, the internal sound-guiding path 413b opens to the outside and the external sound-guiding path 430b connected to the opening of the internal sound-guiding path 413b is constituted between the electro-optical device and the case 430. Therefore, compactness of the electro-optical device can be maintained and an optimum external sound-guiding path 430b can be constituted according to the structure of the case 430. As a result, the degree of freedom for the design of the electronic apparatus 400 can be secured, and compactness or utilization efficiency of sound can be enhanced.

In particular, in the present embodiment, the internal sound-guiding path 413b opens at the side surface of the electro-optical device, and the external sound-guiding path 430b connected to the internal sound-guiding path 413b opens at the front surface of the case 430 (the surface in which the display window 430a is provided). Therefore, compactness can be secured and utilization efficiency of sound can be enhanced at high level.

Fifth Embodiment

Figure 6A:
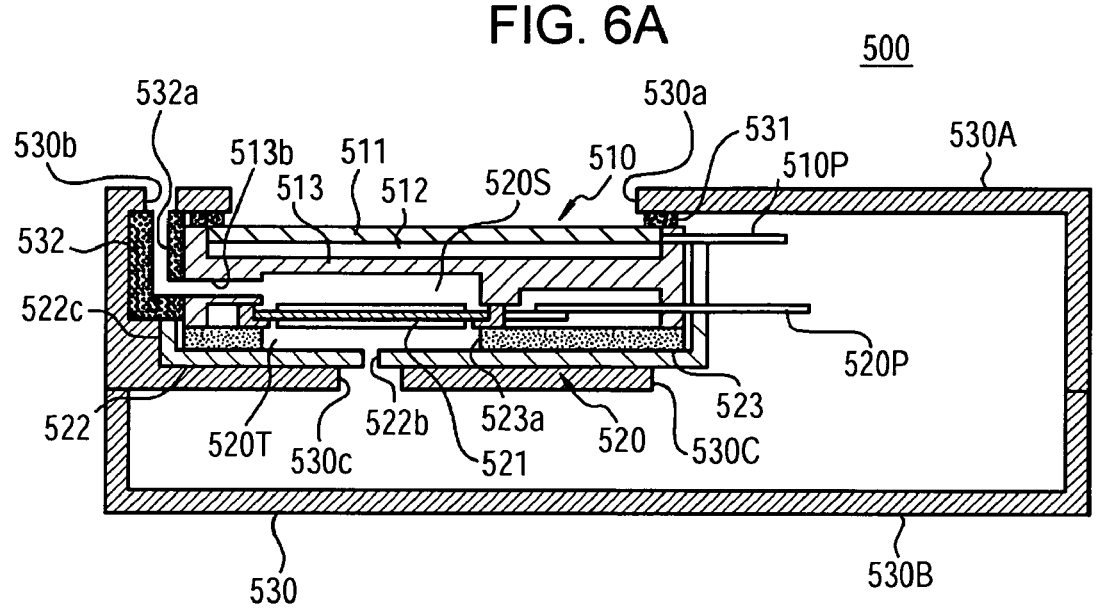
FIG. 6A is a cross-sectional view of an electro-optical device according to a fifth embodiment of the invention.
Figure 6B:
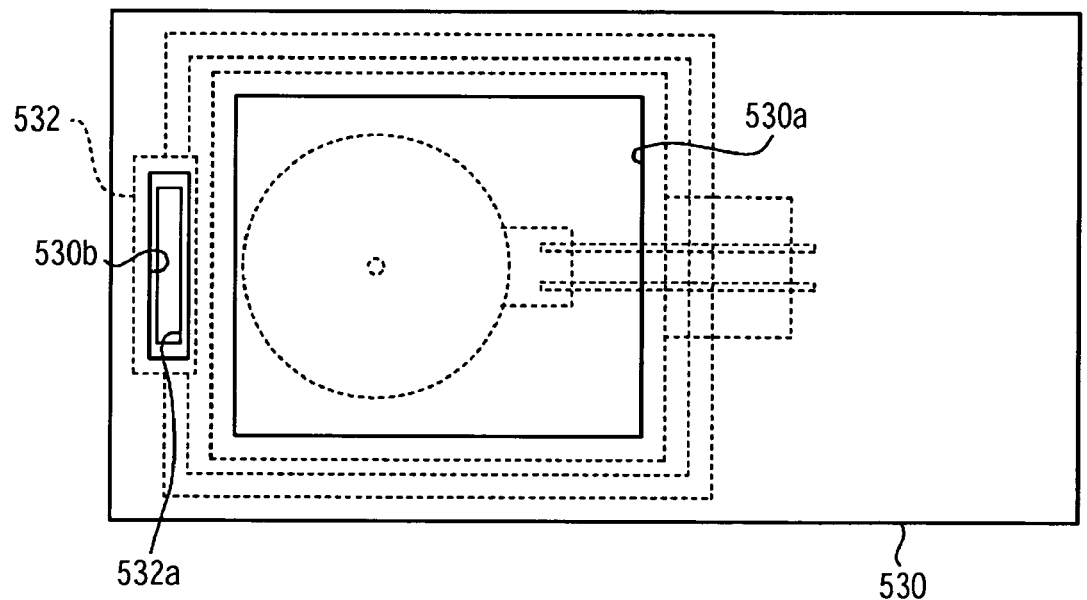
FIG. 6B is a plan view of the electro-optical device according to the fifth embodiment of the invention.
Figure 7:
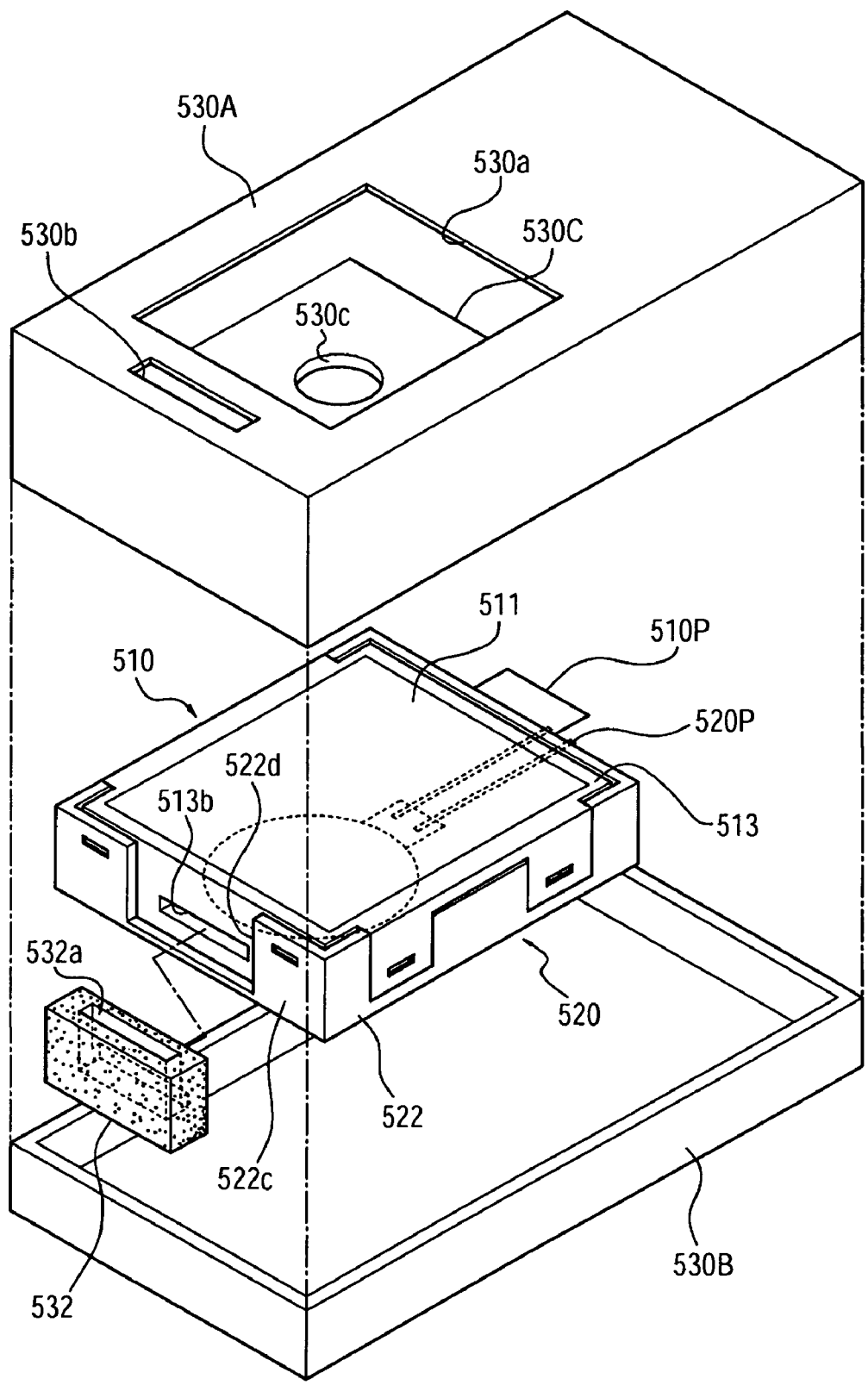
FIG. 7 is an exploded perspective view of the electro-optical device according to the fifth embodiment of the invention.

Next, an electronic apparatus according to a fifth embodiment of the invention will be described with reference to FIGS. 6A, 6B, and 7. FIG. 6A is a cross-sectional view taken along one direction (short-side direction) of the electronic apparatus according to the fifth embodiment of the invention. FIG. 6B is a plan view of the electronic apparatus according to the fifth embodiment of the invention. Further, FIG. 7 is an exploded perspective view of the electronic apparatus according to the fifth embodiment of the invention. In an electro-optical device of the present embodiment, other parts, which are not shown in FIGS. 6A, 6B, and 7, can be constituted similarly to those in the above-described second embodiment and thus the descriptions thereof will be omitted.

The electro-optical device of this embodiment includes a display section 510 having an electro-optical panel 511 and a sound-production section 520 having a sound-production unit 521. Here, the electro-optical panel 511, a backlight 512, a holding frame 513, the sound-production unit 521, a sound-production frame 522, and a support member 523 are the same as those in the fourth embodiment and thus the descriptions thereof will be omitted.

In this embodiment, a case 530 for supporting the electro-optical device is constituted by an upper half 530A and a lower half 530B, and the upper half 530A and the lower half 530B are fixed to each other. In the front surface of the upper half 530A, a display window 530a, through which the display screen of the electro-optical panel 511 can be viewed, is provided. Further, a sound releasing hole 530b is formed on the side of the display window 530a. Further, a support frame 530C is provided inside the case 530, such that the electro-optical device is supported by the support frame 530C. The support frame 530C may be constituted integrally with the case 530. Alternatively, the support frame 530C may be provided separately from the case 530 to be fixed to the case 530. Further, in the support frame 530C, an opening 530c is provided at the position corresponding to a sound releasing hole 522b provided in the sound-production frame 522 of the electro-optical device.

Moreover, as shown in the drawings, the case 530 does not necessarily have a bisection structure. For example, the case 530 may have three or more division parts. Alternatively, the case 530 may be constituted as a single body, as long as there is no problem in housing the electro-optical device or at the time of an assembling work.

In the present embodiment, like the fourth embodiment, an external sound-guiding path 532a connected to an internal sound-guiding path 513b of the holding frame 513 is provided between the electro-optical device and the case 530. However, the present embodiment is different from the fourth embodiment in that the external sound-guiding path 532a is defined inside a sound-guiding member 532 that is disposed between the electro-optical device and the case 530. Referring to the drawings, the sound-guiding member 532 is interposed between electro-optical device and the case 530 when the electro-optical device is attached to the case 530. More specifically, as shown in FIG. 7, the sound-guiding member 532 is fitted into a notch-shaped opening 522d that is provided at a side wall 522c of the sound-production frame 522 to be positioned. Then, the state, in which the sound-guiding member 532 is fitted into the opening 522d, is held by the inner surface of the case 530 that contacts the sound-guiding member 532 from an opposite side thereof. As such, if the sound-guiding member 532 is positioned while being interposed between the electro-optical device and the case 530, an end of the external sound-guiding path 532a on an-opposite side to the internal sound-guiding path 513b is connected to a sound releasing hole 530b that is provided in the case 530.

The sound-guiding member 532 can be made of the same material as that of the support member 123 or 124 in the first embodiment. Alternatively, the sound-guiding member 532 may be made of synthetic resin or a metal, like the case 530.

Sixth Embodiment

An electronic apparatus of a sixth embodiment according to the invention, in which the above-described electro-optical device is mounted, will be described with reference to FIGS. 9 and 10. In this embodiment, an electronic apparatus that has the above-described electro-optical device 100 according to the first embodiment of the invention as a display unit will be described. Here, the electro-optical devices according to the second and third embodiments can be used as the electro-optical device of the present embodiment, like the electro-optical device 100. Further, the configuration of the electronic apparatus of the fourth or fifth embodiment can be applied to the present embodiment.

Figure 9:
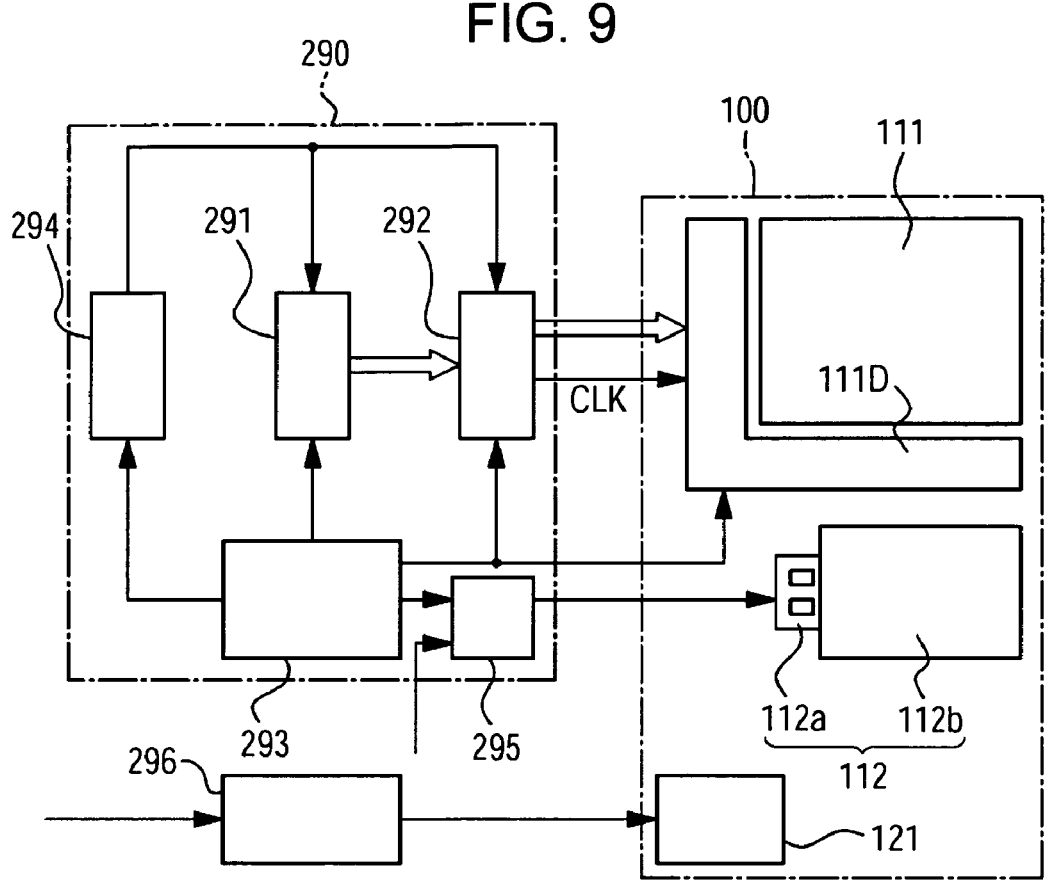
FIG. 9 is a diagram schematically showing an overall configuration of a control system in an electronic apparatus according to a sixth embodiment of the invention.

FIG. 9 is a diagram schematically showing the overall configuration of a control system (display control system) with respect to the electro-optical device 100 in the electronic apparatus of the present embodiment. The electronic apparatus shown in FIG. 9 has a display control circuit 290 that includes a display information output source 291, a display information processing circuit 292, a power supply circuit 293, a timing generator 294, and a light-source control circuit 295.

Further, in the above-described electro-optical device 100, a driving circuit 111D that drives the electro-optical panel 111 having the above-described configuration is provided. The driving circuit 111D is constituted by electronic parts (semiconductor ICs and the like) that are mounted directly on the electro-optical panel 111. Here, in addition to the above-described configuration, the driving circuit 111D may be constituted by a circuit pattern formed on the surface of the panel or a semiconductor IC chip or circuit pattern mounted on a circuit board that is electrically connected to a liquid crystal panel.

The display information output source 291 includes a memory that has the ROM (Read Only Memory), the RAM (Random Access Memory), or the like, a storage unit that has a magnetic recording disc, an optical recording disc, or the like, and a tuning circuit that synchronously outputs digital image signals. The display information output source 291 is constituted to supply display information to the display information processing circuit 292 in a shape of an image signal having a predetermined format or the like based on various clock signals generated by the timing generator 294.

The display information processing circuit 292 includes various known circuits, such as a serial-to-parallel conversion circuit, an amplification/inversion circuit, a rotation circuit, a gamma correction circuit, a clamping circuit, and the like. The display information processing circuit 292 processes the input display information and supplies resultant image information to the driving circuit 111D, together with a clock signal CLK. The driving circuit 111D includes a scanning line driving circuit, a signal line driving circuit, and a test circuit. Further, the power supply circuit 293 supplies predetermined power to the respective parts described above.

The light-source control circuit 295 supplies power supplied from the power supply circuit 293 to a light-source section 112a of the backlight 112 based on a control signal from the outside. Light emitted from the light-source section 112a is incident on a light guiding plate 112b and is irradiated from the light guiding plate 112b onto the electro-optical panel 111. The light-source control circuit 295 controls turning-on or turning-off of each light source of the light-source section 112a according to the control signal. Further, the light-source control circuit 295 may control luminance of each light source.

Further, a sound signal output circuit 296 is provided in the electronic apparatus of the present embodiment. The sound signal output circuit 296 sends a sound signal to the sound-production unit 121 based on a control signal from a control circuit (not shown). In the sound-production unit 121, the vibration is generated based on the sound signal to be supplied and sound is outputted based on the vibration.

Figure 10:
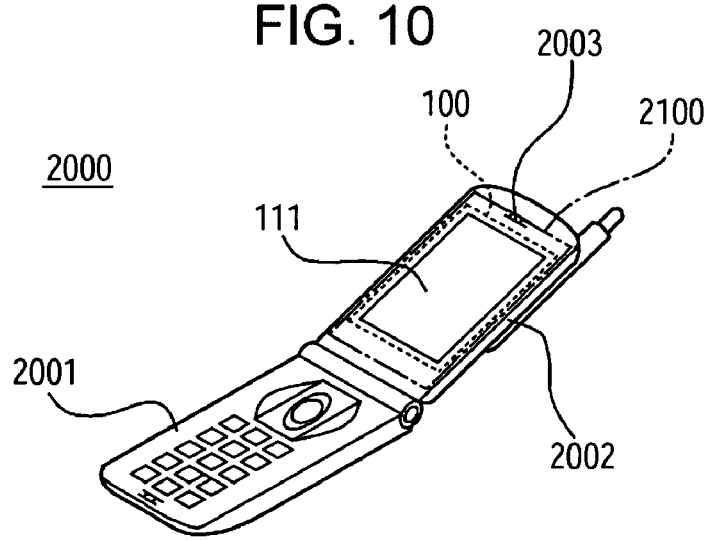
FIG. 10 is a perspective view of the electronic apparatus according to the sixth embodiment of the invention.

FIG. 10 shows an external appearance of a cellular phone that is an embodiment of the electronic apparatus according to the invention. The electronic apparatus 2000 has an operating section 2001 and a display section 2002. Inside the case of the display section 2002, a circuit board 2100 is disposed. The above-described electro-optical device 100 is mounted on the circuit board 2100. Then, the above-described liquid crystal panel 111 can be viewed through the surface of the display section 2002. Further, a sound output slot 2003 is provided in the display section 2002. The sound output slot (sound-releasing hole) 2003 is constituted such that the sound outputted from the sound-production unit 121 to be guided via the internal sound-guiding path or the external sound-guiding path can be heard outside the case of the display section 2002.

Moreover, it should be understood that the electro-optical device with the sound-production unit and the electronic apparatus of the invention are not limited to the above-described embodiments, but various changes can be made within the scope without departing from the subject matter of the invention. For example, though the piezoelectric speaker having the piezoelectric vibrating body as the sound-production unit is used in the respective embodiments described above, the present invention is not limited to the piezoelectric speaker. For example, a suitable vibrating body, such as an electromagnetic speaker, or the like, may be used as long as it generates sound waves. Further, though the sound-production unit is fixed to the sound-production frame in the respective embodiments described above, the sound-production unit may be fixed to the panel-holding frame (for example, the bottom surface thereof). In addition, though the sound is emitted via the external sound-guiding path to the outside in the embodiment of the electronic apparatus described above, in the electronic apparatus, the internal sound-guiding path of the electro-optical device may be connected directly to the sound-releasing hole of the case and the internal sound-guiding path may open directly to the outside.

What is claimed is:

1. An electro-optical device comprising:
an electro-optical panel;
a sound-production unit including a first surface facing toward the electro-optical panel and a second surface that is opposite the first surface and that faces away from the electro-optical panel, the sound-production unit including a piezo-electric vibrating body;
a sound-production frame that holds the sound-production unit, the sound-production frame including a flat internal surface, a through hole opening, and an air inlet that allows passage of air between the sound-production frame and the sound-production unit, the air inlet overlapping the sound-production unit in plan view;
a holding frame that holds the electro-optical panel and that is connected to the sound-production frame, the holding frame having a first surface wall facing the electro-optical panel and a second surface wall facing away from the electro-optical panel, the second surface wall also facing the flat internal surface of the sound-production frame, the second surface wall of the holding frame defining a sound-production air space with the sound-production frame, the holding frame including an internal sound-guiding path that is in fluid communication with the sound-production air space and that opens to outside of the holding frame, the holding frame including a projection that is received in the through hole opening of the sound-production frame;
a first support member that abuts the second surface of the sound production unit and the sound-production frame to be interposed between the second surface of the sound production unit and the sound-production frame; and
a second support member that abuts the flat internal surface of the sound-production frame and the second surface wall of the holding frame to be disposed between both the sound-production frame and the holding frame.

2. The electro-optical device according to claim 1, wherein the internal sound-guiding path opens at a front surface or a side surface of the holding frame.

3. The electro-optical device according to claim 1, wherein the second support member defines the sound-production air space with the holding frame and the sound-production frame.

4. The electro-optical device according to claim 3, wherein an air space between the holding frame and the sound-production unit and an air space between the sound-production frame and the sound-production unit are separated from each other by the support member and the sound-production unit.

5. The electro-optical device according to claim 1, wherein the sound-production unit overlaps the electro-optical panel in plan view.

6. The electro-optical device according to claim 1, wherein the internal sound-guiding path opens at a position where the sound-production unit and the electro-optical panel do not overlap each other.

7. An electronic apparatus comprising:
the electro-optical device according to claim 1; and
a support body that supports the electro-optical device.

8. The electronic apparatus according to claim 7, wherein an external sound-guiding path is provided between the electro-optical device and the support body so as to be connected to the internal sound-guiding path, and the external sound-guiding path opens at a surface near the electro-optical panel.

9. The electronic apparatus according to claim 8, wherein the external sound-guiding path is constituted by a sound-guiding member that is disposed between the electro-optical device and the support body.

* * * * *